United States Patent
Seckel

(10) Patent No.: US 7,255,910 B1
(45) Date of Patent: Aug. 14, 2007

(54) DOMED PACKING MATERIAL AND METHODS

(76) Inventor: Peter H. Seckel, 459 Passaic Ave., #315, West Caldwell, NJ (US) 07006

( * ) Notice: Subject to any disclaimer, the term of this patent is extended or adjusted under 35 U.S.C. 154(b) by 129 days.

(21) Appl. No.: 10/934,521

(22) Filed: Sep. 7, 2004

Related U.S. Application Data

(63) Continuation-in-part of application No. 09/605,555, filed on Jun. 29, 2000, now Pat. No. 6,926,947.

(51) Int. Cl.
*B32B 1/00* (2006.01)
*B65D 65/22* (2006.01)
*B65D 81/02* (2006.01)

(52) U.S. Cl. .............. 428/174; 428/179; 428/212; 493/967; 229/87.03; 206/585; 206/814

(58) Field of Classification Search .......... 428/174, 428/178, 181, 179, 176, 212; 206/585, 814; 229/87.01, 87.03; 493/967
See application file for complete search history.

(56) References Cited

U.S. PATENT DOCUMENTS

| | | | |
|---|---|---|---|
| 2,311,473 A | * | 2/1943 | Schwartzberg ............... 217/26 |
| 2,318,077 A | * | 5/1943 | Jonas ........................... 211/46 |
| 3,575,781 A | * | 4/1971 | Pezely .......................... 428/180 |
| 3,895,456 A | * | 7/1975 | Fabre ........................... 446/109 |
| 5,066,400 A | * | 11/1991 | Rocklitz et al. .......... 210/493.5 |
| 5,124,191 A | * | 6/1992 | Seksaria ...................... 428/178 |
| 5,593,755 A | * | 1/1997 | Fuss ............................. 428/134 |
| 6,926,947 B1 | * | 8/2005 | Seckel ......................... 428/174 |

* cited by examiner

*Primary Examiner*—Donald J. Loney
(74) *Attorney, Agent, or Firm*—Norris, McLaughlin & Marcus, P.A.

(57) ABSTRACT

A packing material has a plurality of separable layers of pliable material. Each layer has a region containing a plurality of domes in a pattern extending in two directions. The plurality of domes are nested together in the region. The plurality of domes each have a top, a base and a side extending from the top to the base at an angle of divergence exceeding 10°. The plurality of domes have a dome height of at least ⅛ inch. Adjacently nested pairs of the domes have between them an overhead gap no greater than 10% of the dome height. The plurality of separable layers with the plurality of domes can be separated and disoriented to occupy a larger volume. These separable layers may be discrete layers, pleats in a web, or sections of a web.

19 Claims, 19 Drawing Sheets

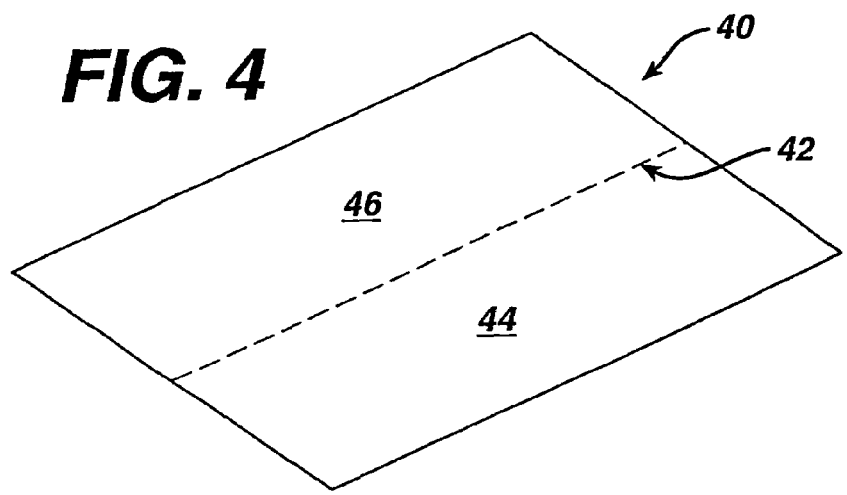
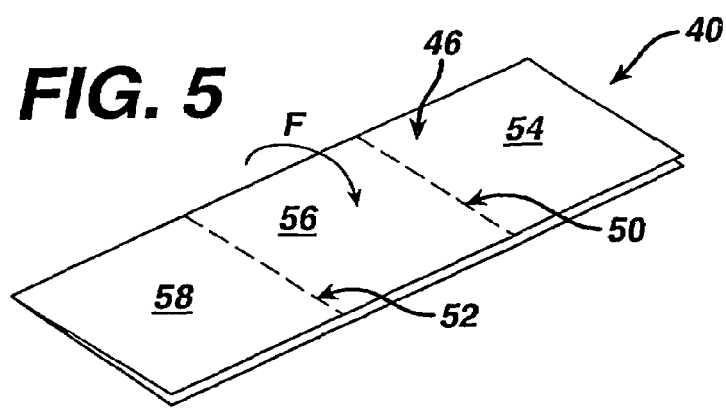
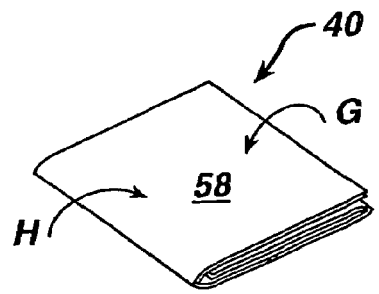
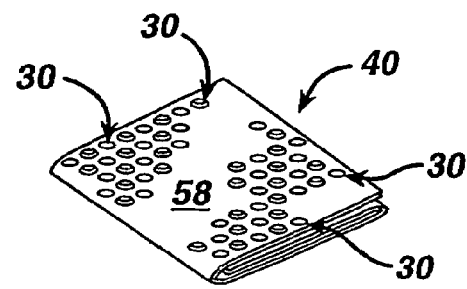

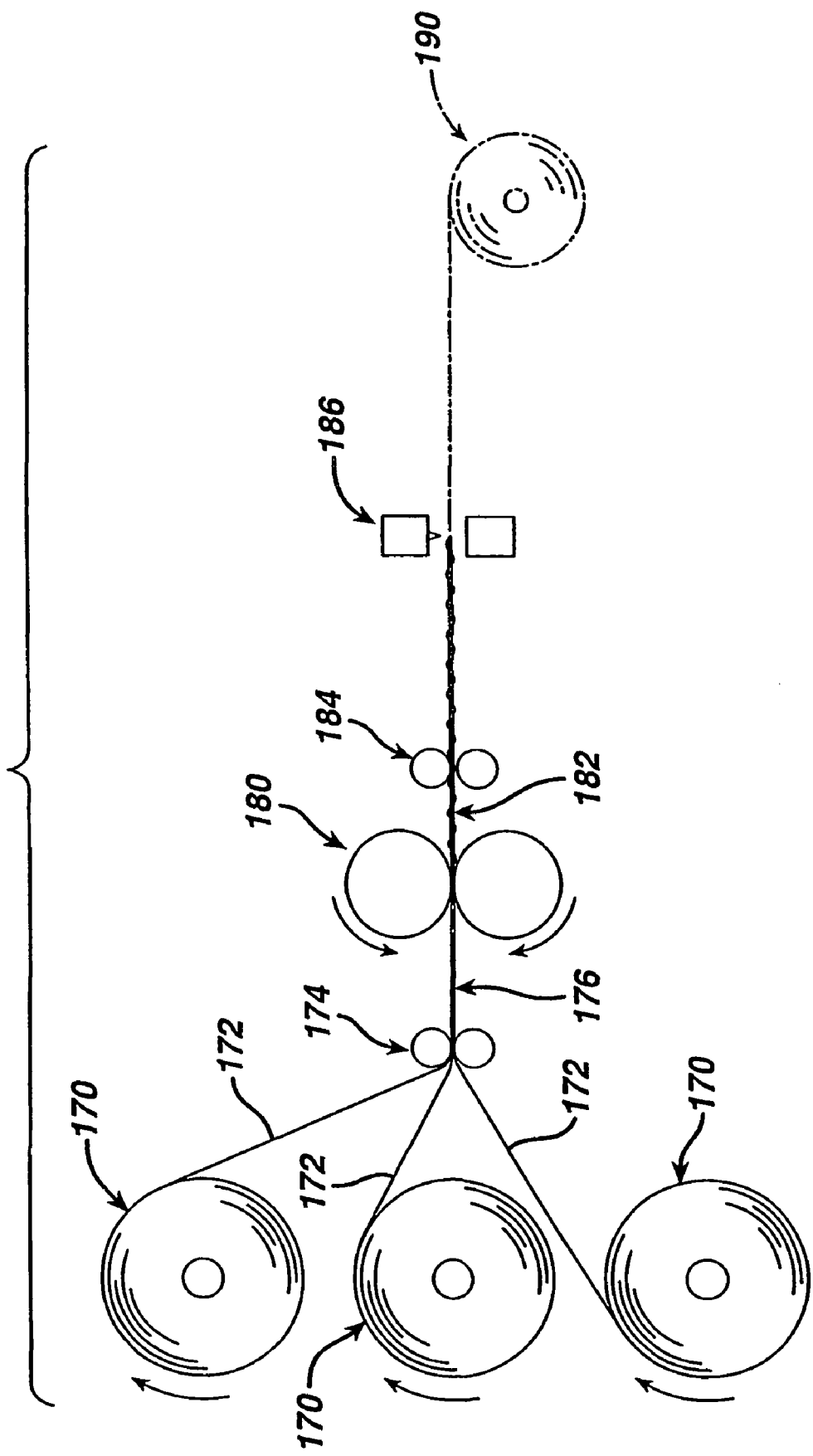

FIG. 13

O = Down dome;  X = Up dome

| | |
|---|---|
| O X O O X O X X | Original algorithm |
| X O O X O X X O | One letter forward, square |
| O O X O X X O X | Ditto, diagonal |
| O X O X X O X O | Ditto, diagonal |
| X O X X O X O O | Ditto, square |
| O X X O X O O X | Ditto, square |
| X X O X O O X O | Ditto, diagonal |
| X O X O O X O X | Ditto, diagonal |

DOMED PACKING MATERIAL AND METHODS

CROSS-REFERENCE TO RELATED APPLICATIONS

This application is a continuation-in-part of U.S. patent application Ser. No. 09/606,555, filed on Jun. 29, 2000, now U.S. Pat. No. 6,926,947 the contents of which are hereby incorporated by reference in its entirety.

BACKGROUND OF THE INVENTION

1. Field of the Invention

The present invention relates to packing materials for use in, cushioning items, and more specifically to a packing material having a plurality of layers of material which nest to take a relatively small amount of space prior to use, but which layers can be pulled apart and disoriented to take up a larger amount of space to function as a packing material.

2. Description of Related Art

In the past, there have been many attempts to provide packing materials for positioning around items to be shipped in containers, boxes or otherwise. Crumpled newspaper is one such packing material that is and has been in widespread use. Shredded paper is another such material. These materials suffer from moisture absorption and provided limited elastic cushioning. Another common material is plastic "bubble wrap," trademarked "BUBBLE WRAP" by the Sealed Air Corporation and which consists of a lower layer and an upper layer with numerous air bubbles formed therebetween for holding air. This packing material is very useful because it is very light in weight. However, one particular problem with bubble wrap material, which has not been overcome is the fact that even when it is not in use, it still takes up a large amount of space. Bubble wrap material is bulky and space consuming through its entire life—from manufacturing, shipping, storage on distributor and retail shelves, in homes or factories before use and lastly during its disposal. Because of the large continual space requirements, individuals, businesses, and others may be reluctant to purchase and store this material.

Various other types of packing materials have also been invented and used, including, pellets made of styrofoam or other materials, shells made of styrofoam, etc. Another material used for packing is embossed paper. Again, as with the bubble wrap, a common problem among all of these materials is that they are bulky during their entire life.

Other efforts in this and related areas include the following:

U.S. Pat. No. 5,538,778 to Hurwitz, et al., which discloses a cushioning material for packing in the form of an expanded paper material which can be shipped in an unexpanded form and expanded prior to use. It is designed with a plurality of slits and then pulled to form hexagonal cells.

U.S. Pat. No. 4,518,643 to Francis, discloses a plastic film having a permanently embossed design or geometric shape for controlling the coefficient of friction between adjacent sheets of film.

U.S. Pat. No. 3,575,781 to Pezely, discloses a plastic film wrapping material formed with hemispherical protuberances thereon. These sheets will nest loosely and take up significant storage space.

U.S. Pat. No. 3,231,454 to Williams, discloses a cushioning packaging material formed of either one or two sheets having a plurality of hollow projections extending from one side of the sheet in the same direction. When a bottom surface is utilized, a vent is provided in the projections to allow air to escape. Again, this material will occupy much space prior to use.

Others works, in related areas, include: U.S. Pat. No. 2,285,335 to Hurt; U.S. Pat. No. 5,201,154 to Thomas; U.S. Pat. No. 3,940,811 to Tomikawa, et al.; U.S. Pat. No. 3,911,187 to Raley; U.S. Pat. No. 3,525,663 to Hale; and U.S. Pat. No. 3,484,835 to Trounstine, et al., See also U.S. Pat. No. 3,857,144 to Bustin (embossed sheet material useful for making bags); U.S. Pat. No. 5,447,772 to Flieger (reclosable packaging seals made of interconnecting indentations); and U.S. Pat. No. 3,895,456 to Fabre (constructional elements with peg-and-socket joints).

What has not been previously developed, and what would be highly desirable, is for a packing material that takes up very little space prior to use, but provides bulk and elastic cushioning when in use. The present invention achieves this, as will be hereinafter described. It is believed that nothing prior hereto has been successful in achieving this, and that none of the previous work of others teaches or suggests all of the aspects of the present invention.

OBJECTS AND SUMMARY OF THE INVENTION

It is an object of the present invention to provide a packing material that takes up a small amount of space prior to use, but which can then be converted into a bulky, elastic cushioning packing medium.

It is a further object of the present invention to provide a packing material having domes formed in a layer.

It is an additional object of the present invention to provide a packing material comprising a plurality of sheets of materials with corresponding domes formed therein, which domes nest prior to use.

It is even an additional object of the present invention to provide a domed packing material having a plurality of layers which, when separated and disoriented, take up a large volume of space because of the domes therein.

It is even an additional object of the present invention to provide a packing material comprising a plurality of layers with domes of various sizes and shapes and directions formed therein.

It is even an additional object of the present invention to provide a packing material having a plurality of layers with domes formed therein, wherein the pattern of domes is varied to prevent re-nesting of the layers after they are disoriented.

It is an additional object of the present invention to provide methods for manufacturing the dome packing material of the present invention.

It is a further object of the present invention to provide a packing material that reduces space and costs associated with shipping, storage, the display thereof for sale and its disposal.

It is an additional object of the present invention to provide a method for manufacturing a packing material that is inexpensive.

It is an additional object of the present invention to provide a method for continuous manufacturing of a packing material.

It is an additional object of the present invention to provide a method for manufacturing a packing material that is capable of being assembled into small units convenient for the display and sale thereof.

It is an additional object of the present invention to provide a method for manufacturing a packing material that is capable of being assembled in standard size boxes for sale and display.

In accordance with the illustrative embodiments demonstrating features and advantages of the present invention, there is provided a packing material having a plurality of separable layers of pliable material. Each layer has a region containing a plurality of domes in a pattern extending in two directions. The plurality of domes are nested together in the region. The plurality of domes each have a top, a base and a side extending from the top to the base at an angle of divergence exceeding 10°. The plurality of domes have a dome height of at least ⅛ inch. Adjacently nested pairs of the domes have between them an overhead gap no greater than 10% of the dome height. The plurality of separable layers with the plurality of domes can be separated and disoriented to occupy a larger volume.

In accordance with another aspect of the invention a packing material is provided as a web having a plurality of pleats of pliable material. Each pleat has a region containing a plurality of domes in a pattern extending in two directions. The domes in each successive pair of the plurality of pleats are inverted in mirror image fashion to allow the domes in that successive pair of the plurality of pleats if folded to nest together. The plurality of domes each are at least ⅛ inch high. The plurality of domes each have a top, a base and a side extending from the top to the base at a diverging angle. Thus, the plurality of pleats with the plurality of domes, if nested, can be separated and disoriented to occupy a larger volume.

In accordance with yet another aspect of the invention, a method is provided for storing and using multiple layers of packing material having domes with a predetermined dome height. The method includes the step of storing the layers of material with the domes of adjacent layers nested together and having between adjacent ones of the domes an overhead gap no greater than 10% of the predetermined dome height. Another step is separating the layers of material. The method also includes the step of placing the layers about an object in a disoriented fashion to cause the layers to occupy a larger volume.

In accordance with still yet another aspect of the invention, a method is provided for making a packing material from at least one layer of pliable material. The method includes the step of pressing a first section and a second section of the at least one layer to form a respective first and second plurality of domes in two complementary patterns each extending in two directions. The domes of the second plurality are inverted relative to the domes of the first plurality. Another step is folding the at least one layer to nest the domes of the first section and the second section together.

In accordance with still yet another aspect of the invention, a method is provided for providing packing material having a plurality of layers of pliable material each with a plurality of domes having a predetermined dome height. The plurality of domes each have a top, a base and a side extending from the top to the base at an angle of divergence. The method includes the step of overlapping the plurality of layers with the domes nested together. Adjacently nested pairs of the domes have between them an overhead gap no greater than 10% of the predetermined dome height. The overlapping of the plurality of layers is performed in a manner to keep the angle of convergence of the domes greater than 10°.

The present invention relates to a packing material having a plurality of domes formed therein. The domes can be formed in more than one direction and can be of different sizes. A plurality of layers of a pliable plastic material are placed together to form a composite material, and domes are formed in the composite material. Thereafter, the composite material can be fan folded, cut or torn to desired sizes or shapes. Importantly, the domes formed in the layers are closely nested and accordingly, the packaging material takes up a small amount of space after same is manufactured. This serves to reduce the expense and space requirements for storage and shipping and disposal. In use, one separates the layers of the composite materials, and disorients same, and utilizes the layers for a packing material. Importantly, it is preferable that the domes are sized or shaped and positioned to tend against re-nesting. Methods of making the material are also set forth.

BRIEF DESCRIPTION OF THE DRAWINGS

Other important objects and features of the invention will be apparent from the following Detailed Description of the Invention taken in connection with the accompanying drawings in which:

FIGS. 4, 5, 6, 7, and 8 are perspective views of a substrate for forming a plurality of layers of packing material by folding one sheet in a plurality of directions, and then processing the sheet to form domes therein, and subsequently unfolding the assembly.

FIG. 11 is a schematic view of another method of forming the domed packing material of the present invention.

FIG. 13 is a diagram of a potential scheme of domes formed in layers according to the present invention designed to prevent re-nesting of the layers once the layers are disoriented.

DETAILED DESCRIPTION OF THE PREFERRED EMBODIMENTS

The present invention relates to a packing material having a plurality of domes formed in multiple assembled but separable layers of pliable material. In the first series of embodiments, a plurality of sheets are stacked together and then domes are formed in the assembly such that the domes nest completely. This results in a packaging material that takes up a minimal amount of space prior to use. In use, the layers are separated and disoriented to create a packing material that is bulky and elastic. It is preferable that the domes are varied in size and direction to prevent re-nesting of the layers after they are separated and disoriented.

Figure 1:
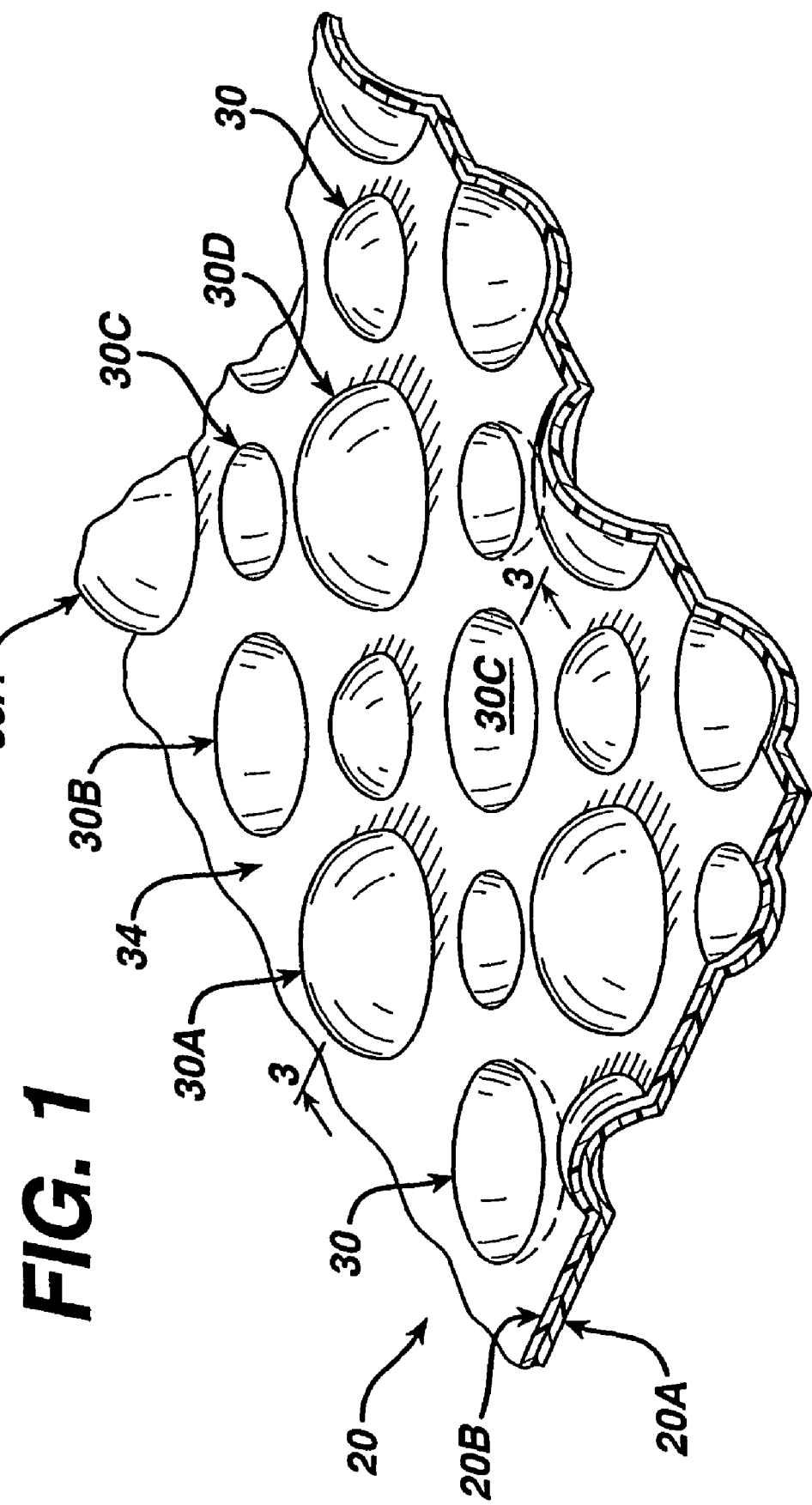
FIG. 1 is a partial perspective view of the domed packing material of the present invention having a plurality of domes of different shapes and directions formed in a plurality of tight layers.

Referring to FIG. 1, a partial perspective view of the domed packaging material, generally indicated at 20, is shown. As can be seen in this view, there is a lower layer generally indicated at 20A and an upper layer generally indicated at 20B. Each layer comprises a film having a thickness in the area of 0.002-0.015 inches. A plurality of layers such as five or six, or more, can be utilized. As can be seen, the packaging material 20 includes a generally flat portion 34 and a plurality of domes 30 extending in various directions, i.e. up dome 30A or down dome 30B in a plurality of sizes such as small dome 30C and large dome 30D. The variation in dome size and direction serves to prevent the re-nesting of sheets of the packaging material 20 after same are separated. Domes of one size, two sizes, or many sizes and shapes can be used, as desired. Likewise, the domes can extend in one direction or both directions. As can further be seen in viewing FIG. 1, the two layers 20A and 20B take up a minimal amount of space as same are nested together. By "nesting" it is meant that there is substantially no air space between the adjacent layers 20A and 20B at the flat portion 34, as well as at the domes 30. In use, as will be hereinafter discussed, after layers 20A and 20B are separated and disoriented, the domes 30 and the respective layers 20A and 20B serve to separate the layers 20A and 20B, and take up a much larger amount of space to function as a packing material.

Various patterns can be implemented to prevent renesting of domes. In the region where domes exist, laterally adjacent ones of the domes can be differently sized, or protrude in opposite directions as shown if FIG. 1. In other embodiments the domes can be shaped differently or be arranged in an asymmetric pattern.

Figure 2:
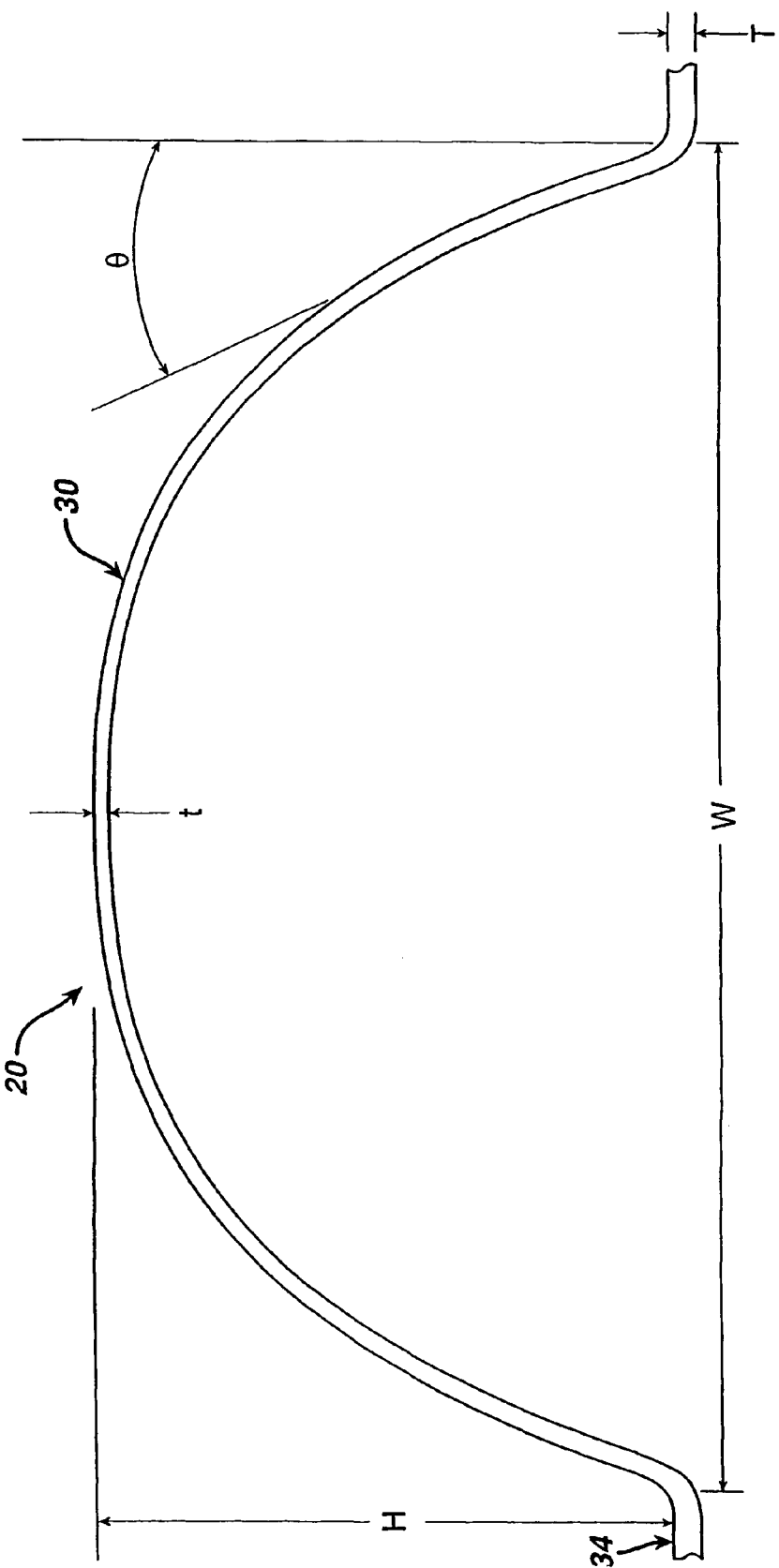
FIG. 2 is a cross-sectional view of a dome in the packing material shown in FIG. 1.

FIG. 2 is a cross-sectional view of a dome 30 of the domed packing material 20. The flat portion 34 of the domed packing material 20 is also shown. The flat portion 34 has a thickness of T, which tapers to a thickness of t at an upper portion of the dome 30. This difference in thickness of the material comprising the dome 30 is accounted for by the stretching associated with forming a dome 30 in the domed packing material 20 which is formed of a polymeric material and stretches during the dome formation process.

Additionally, the dome has a height H, a diameter W. Finally, the dome 30 extends from the flat portion 34 at an angle indicated at θ. The angle θ can clearly be varied as desired. Indeed, the shape of the domes 30 can be varied from dome shapes to any other shape such as pail shaped, square, star shaped, elongated, etc., as desired. However, outward angles of 45 degrees or less are thought to provide a desirable amount of structural compression resistance.

Figure 3:
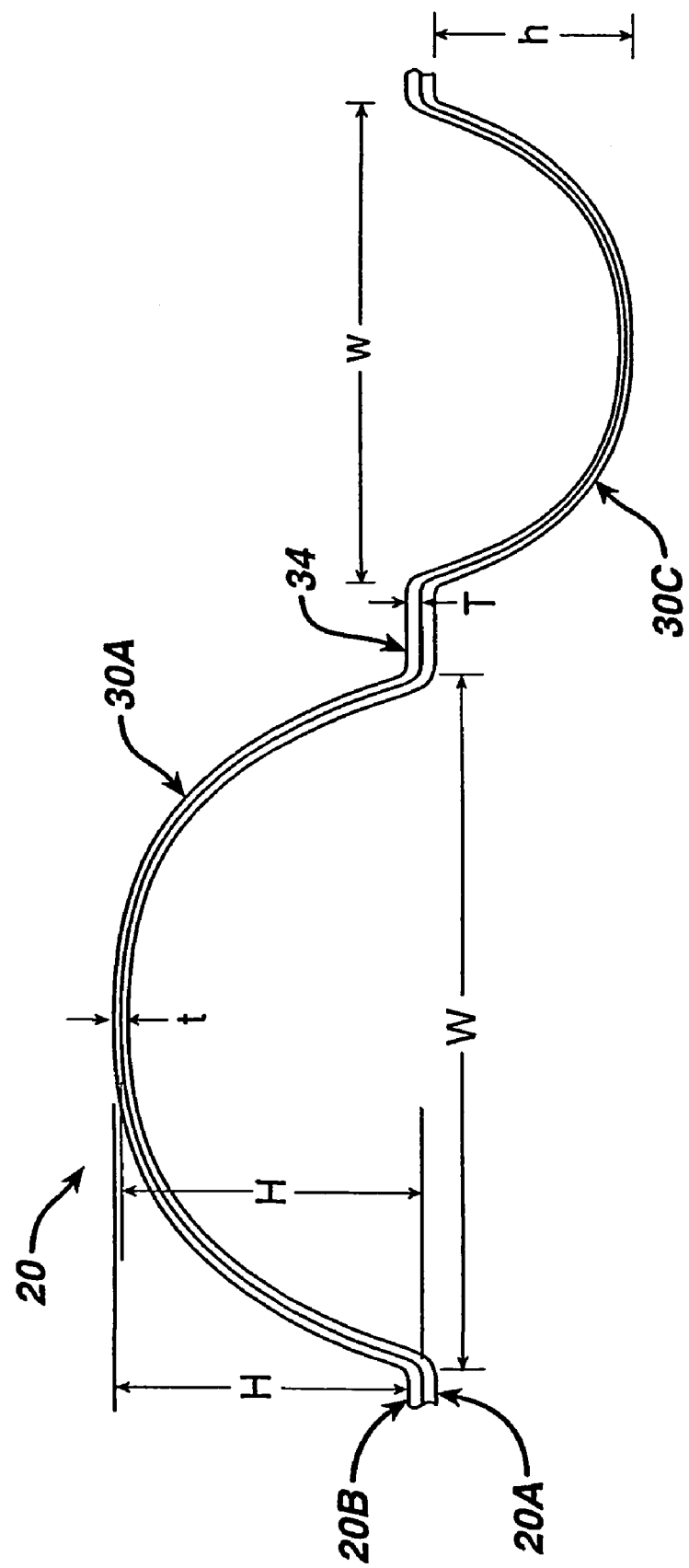
FIG. 3 is a cross-sectional view of a plurality of domes taken along line 3-3 of FIG. 1.

FIG. 3 is a cross-sectional view of the packing material shown in FIG. 1 taken along line 3-3. As can be seen, the domed packing material 20 includes large up dome 30A, and smaller down dome 30C. Flat portion 34 is also pictured. As previously set forth in describing FIG. 1, the domed packing material 20 as shown includes a lower layer 20A and an upper layer 20B. Additional layers would normally be formed at the same time. Up dome 30A has a diameter W, and a height of H for each layer 20A and 20B. For domes to nest completely, each successive-dome needs to be smaller, or respectively larger.

An unexpected observation is that the change in size affects the side-to-side diameter, but not the height. It is believed that suitable heights H for the domes are approximately ⅛ to 5/16 of an inch, but this can be varied as desired. Further, each layer 20A and 20B has a thickness T along the flat portion 34 (on the order of 0.009 inches thick) and a thickness t at an upper portion of the dome 30A. T is greater than t (t may be about 30% less than T) based on the stretching that occurs during formation of the dome 30. Similarly, small down dome 30C had a diameter w and a height h. The height h of the dome 30C is the same for both layers 20A and 20B. Also, there is a difference between the thickness T of the base 34 and the thickness of the small down dome 30C at a mid-portion thereof, again caused by the stretching that occurs during dome formation.

Because the layers are formed together as one single assembly, each dome will be a slightly different shape so that all stacked domes will necessarily nest tightly.

Referring now to FIGS. 4-8, a method of forming a plurality of layers from a single substrate, for forming domes therein, is disclosed. First, as shown in FIG. 4, a sheet of material 40 includes a longitudinal fold line 42 which divides the sheet into first half 44 and second half 46. Referring to FIG. 5, when the sheet 40 is folded in direction of arrow F to position the second half of the sheet 46 over first half of the sheet 44, the sheet becomes half size. A first lateral fold line 50 and a second lateral fold line 52 are provided to divide the sheet 40 further into upper portion 54, middle portion 56 and lower portion 58. Referring to FIG. 6, upper portion 54 can be folded onto middle portion 56 along fold line 50 in a direction shown by arrow G and thereafter, lower portion 58 can be folded over upper portion 54 in the direction of arrow H to fold the substrate 40 to a panel having one-sixth of its original size.

Figure 8:
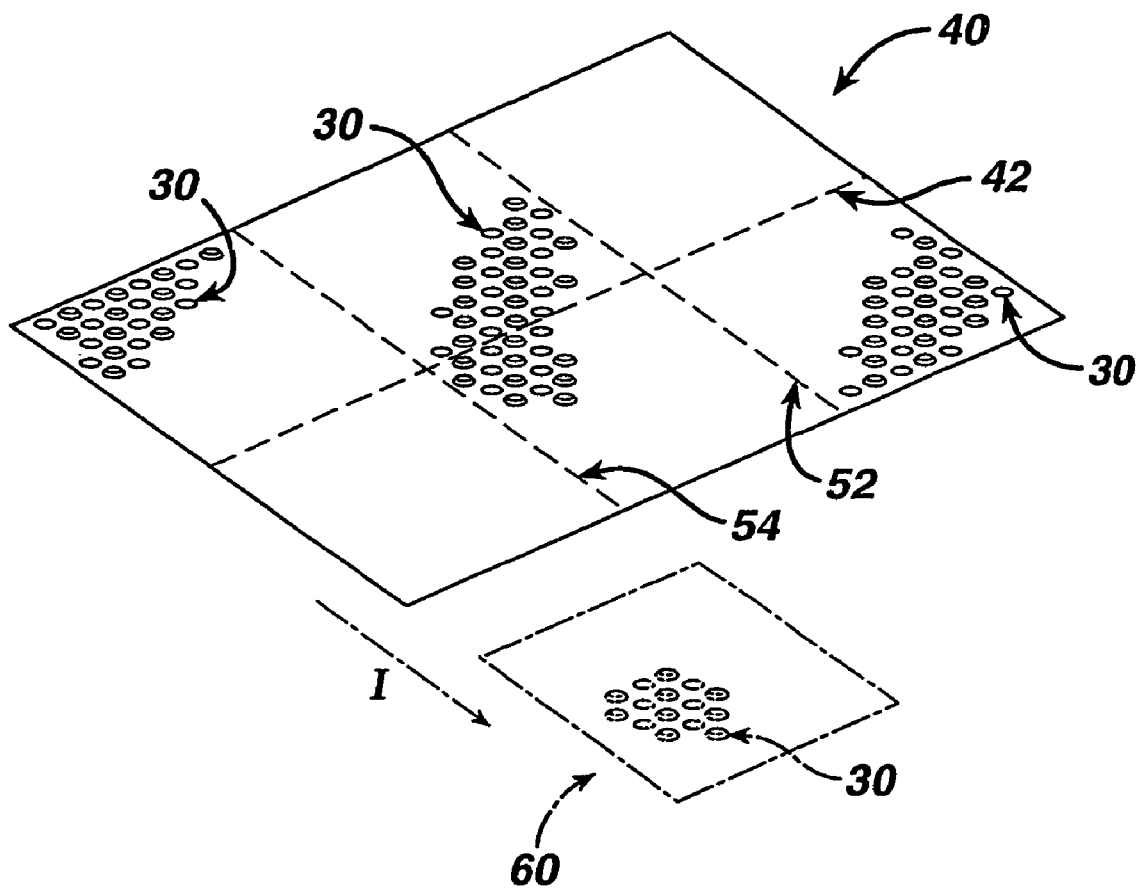

Thereafter, as shown in FIG. 7, the folded material can be processed to form domes 30 in substrate 40 in accordance with the teachings of the present invention. Thereafter, the sheet can be unfolded as shown in FIG. 8 and portions 60 with domes 30 can be separated from the sheet 40 for use. Alternatively, the sheet can be refolded, along different fold lines than those already provided to effectively disorient the domes 30 such that the material generally takes up a large amount of space. Alternatively, more than one panel 60 can be utilized together to function as packing material. Importantly, the product shown in FIG. 8, if, for example, the substrate 40 is a eight and one-half by eleven inch assembled sheet, or other standard size, it can be easily packaged in a standard office box or other convenient package and can be easily stored, displayed and purchased because it does not take up a large amount of space and can be easily handled in a manner similar to the way other packages of similar sizes are handled. Accordingly, the nested packing material of the present invention can be provided in a compact package desirable to the retailer and consumer.

Figure 9:
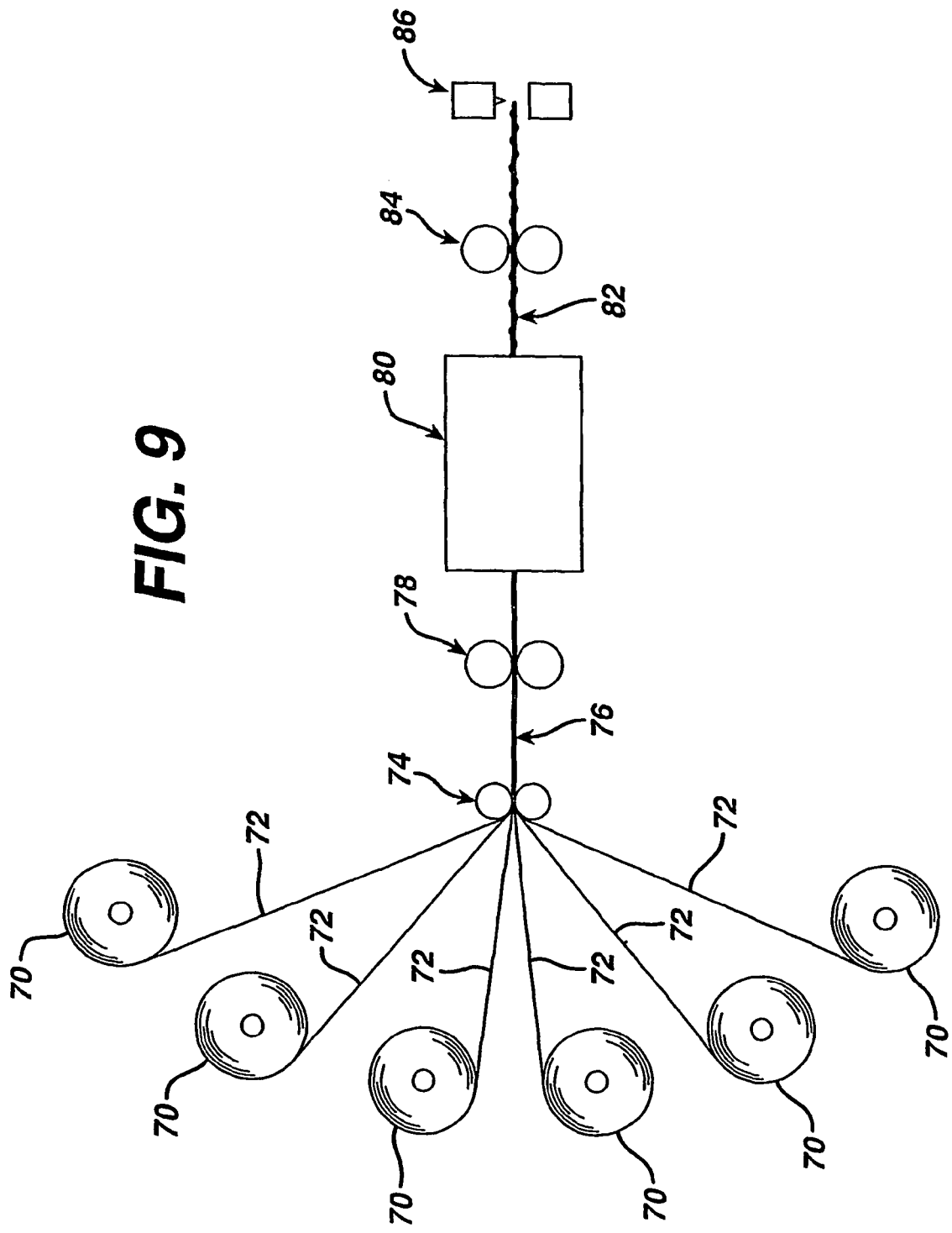
FIG. 9 is a schematic view of a method of forming the domed packing material of the present invention.

Referring to FIG. 9, another process for manufacturing the domed packing composite of the present invention is presented. As can be seen, a plurality of rolls 70 of substrate material such as plastic sheets 72 are provided. Sheets 72 are fed into a first roller 74, where the sheets are put together to form a composite sheet, and then to a second roller 78 which serves to feed the composite sheet 76 formed by the plurality of layers 72. The composite sheet 76 is then fed into processing station 80 where domes are formed in the material to provide a domed sheet 82, which is again fed through third rollers 84 to pull the domed sheet 82 from the processing station 80 and feed the domed sheet 82 to a cutting station 86 wherein the domed sheet 82 is cut into desired sizes for packaging.

FIG. 11 shows another embodiment of a manufacturing process according to the present invention wherein a plurality of rolls, generally indicated at 170, of plastic sheets 172 are fed to a first roller 74 which combines the sheet into a composite sheet 176 which is then fed through textured rollers 180 which forms domes in the material to produce a domed sheet 182 which is then fed through a tensioning second roller 184 and then fed to cutting station 186 or, which can be packaged into rolls 190.

Figure 10A:
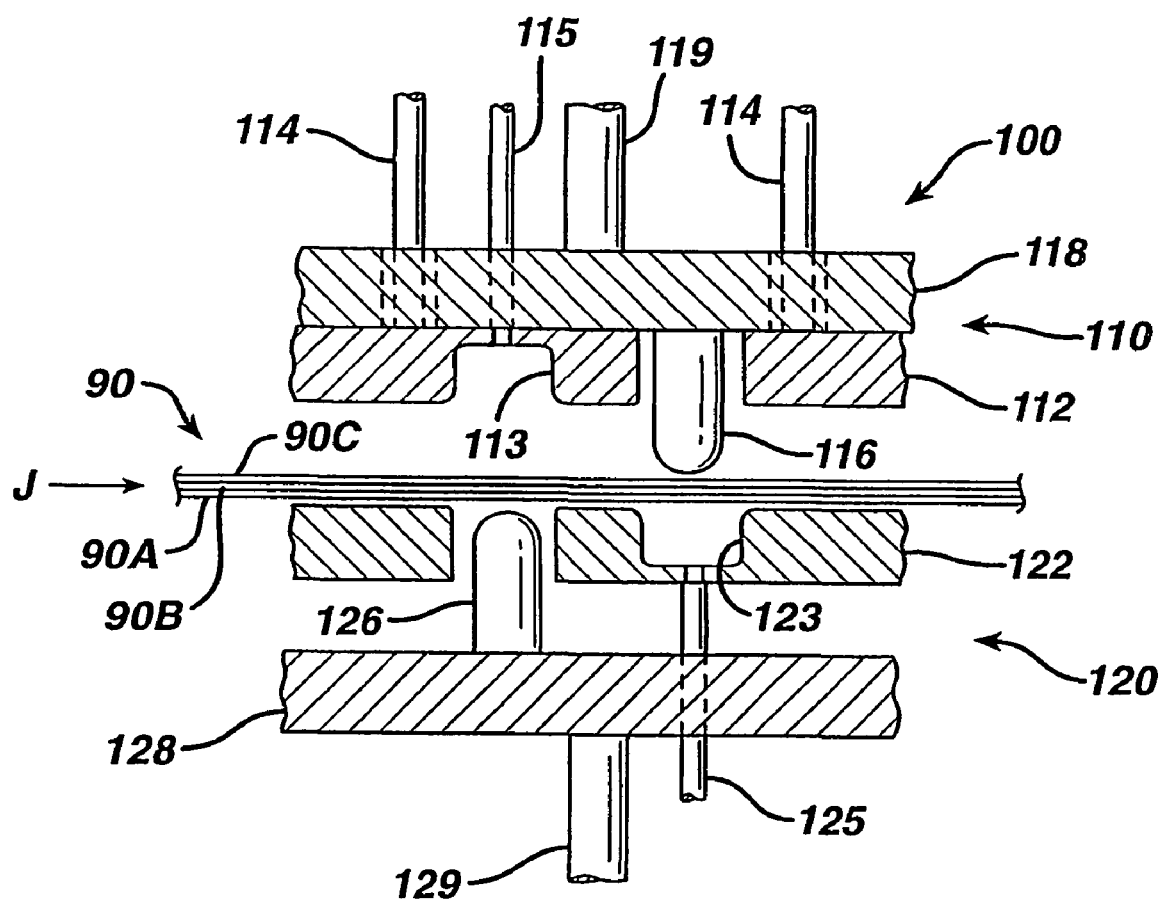
FIGS. 10A-10D show steps for another method of forming the domed packing material of the present invention.

Referring now to FIGS. 10A-10D, a series of processing steps is shown in connection with a batch method of manufacturing the dome packaging material of the present invention. As shown in FIG. 10A a substrate 90 is fed into a press, generally indicated at 100 in a direction shown by arrow J. The substrate 90 can include a plurality of layers such as lower layer 90A, middle layer 90B and upper layer 90C. The press 100 includes an upper press 110 and a lower press 120. The upper press 110 includes an upper clamping plate 112 that is driven by clamping pistons 114 and dome ejector 115. The upper press 110 further includes dome die 116, dome die plate 118, and dome die piston 119. The lower press 120 includes a fixed lower base clamp plate 122, a dome ejector 125, lower dome die 126, dome die plate 128 and dome die plate piston 129. Die domes 116 and 126 preferably have rounded edges to stretch but not pierce the substrate 90.

Figure 10B:
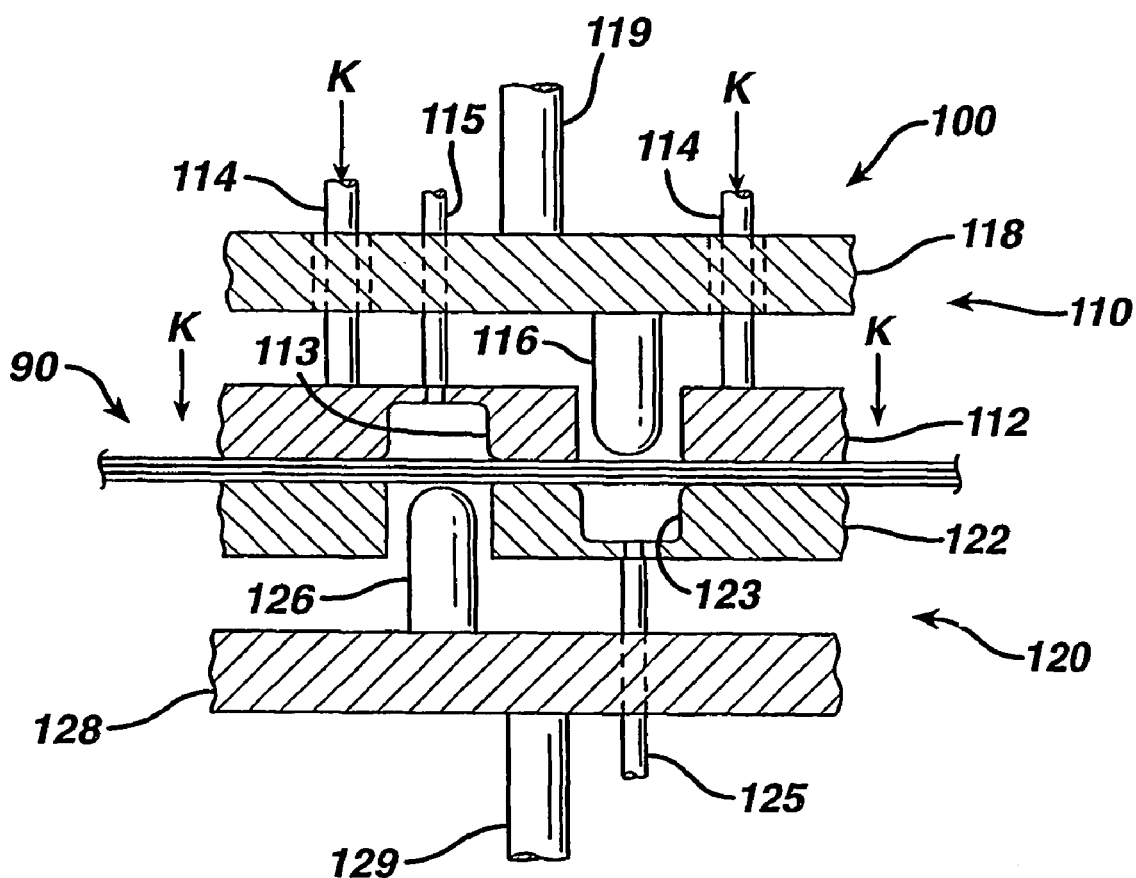

As shown in FIG. 10B, the substrate 90 is maintained between upper and lower clamp plates 112 and 122 respectively by actuating clamp pistons 114 to move the upper clamp plate 112 in the direction shown by arrows K to sandwich the substrate 90 against the fixed lower base clamp plate 122.

Figure 10C:
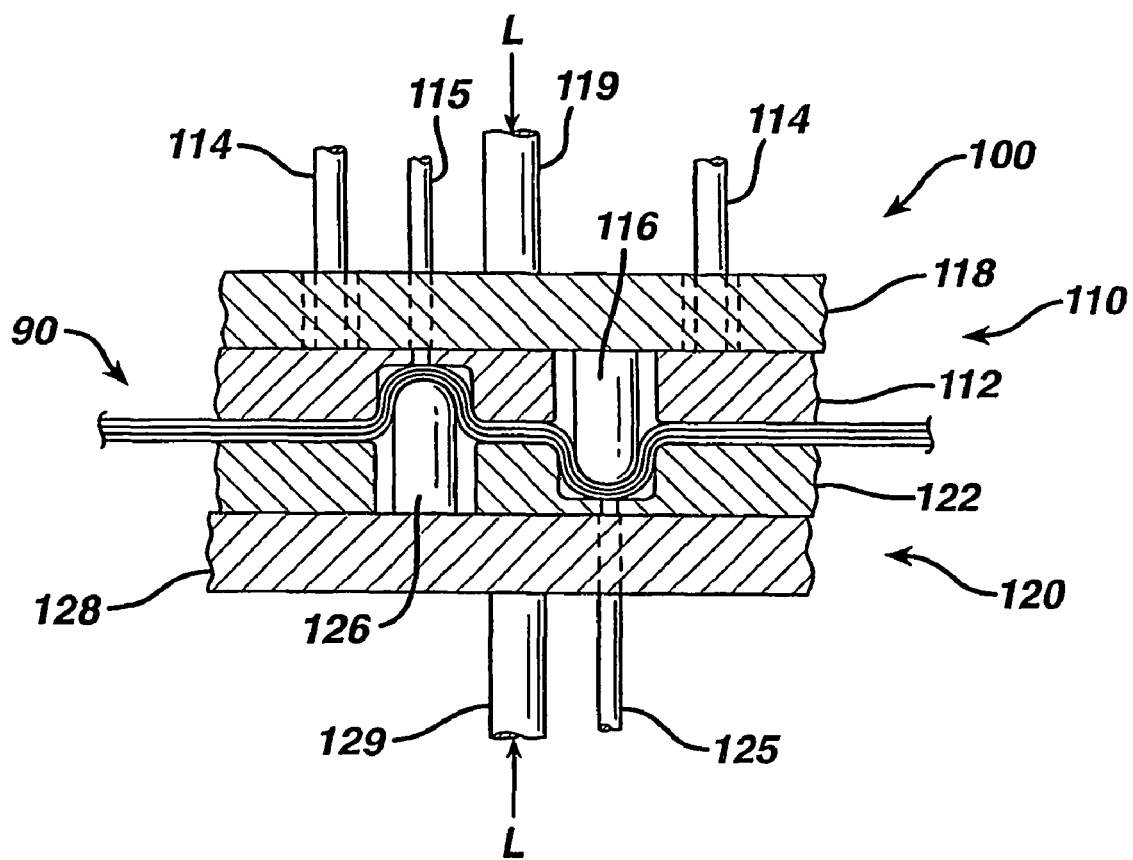

Referring to FIG. 10C, after the substrate 90 is retained between upper and lower clamp plates 112 and 122 respectively, the upper and lower dome die plates 118 respectively are engaged by actuating dome die pistons 119 and 129 respectively to force dome dies 116 and 126 in the directions shown by arrows L, against the substrate 90 and into receptacles 113 and 123 (FIG. 10B) of clamp plates 112 and 122 respectively, to deform the substrate 90 to form domes 30 therein. Importantly, it is desirable that the receptacles 113 and 123 have angled or rounded edges 113A and 123A (FIG. 10D), respectively, to allow the substrate 90 to slide and stretch instead of breaking.

Figure 10D:
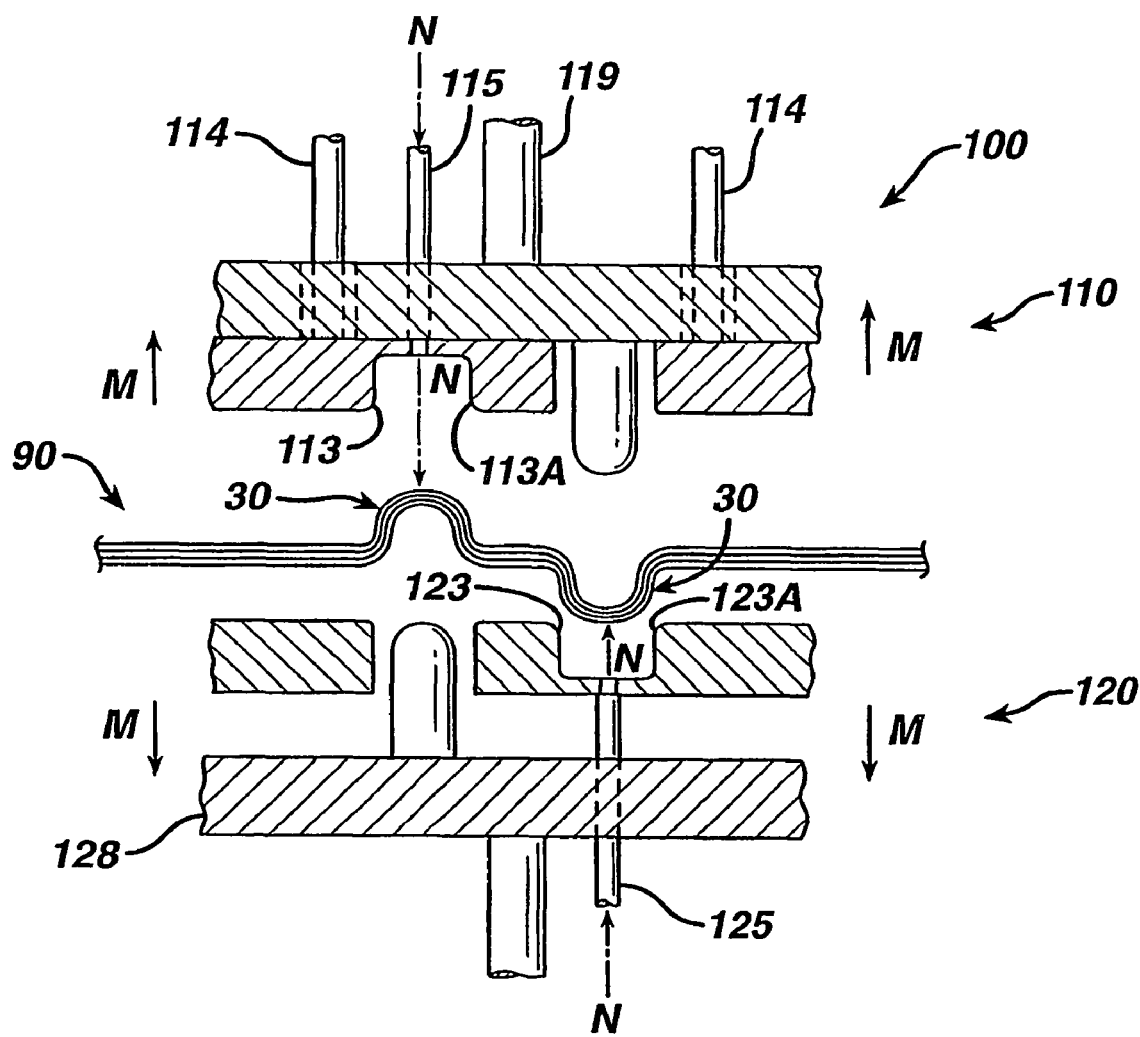

FIG. 10D shows the separation of upper and lower presses 110 and 120 in the directions of arrow M which allows for the substrate 90 with domes to be removed from the press. Importantly, dome ejectors 115 and 125 may be needed to fully eject the domes 30 from the receptacles 113 and 123. The dome ejectors 115 and 125 could be air conduits and a blast of air in the direction shown by arrows N would be sufficient to disengage the domes 30 from the receptacles 113 and 123. Importantly, as can be seen, the layers forming substrate 90, and the domes 30 formed therein, are completely nested. In use, the layers forming substrate 90 are separated and disoriented to provide a packing material that takes up a large volume of space.

Figure 12A:
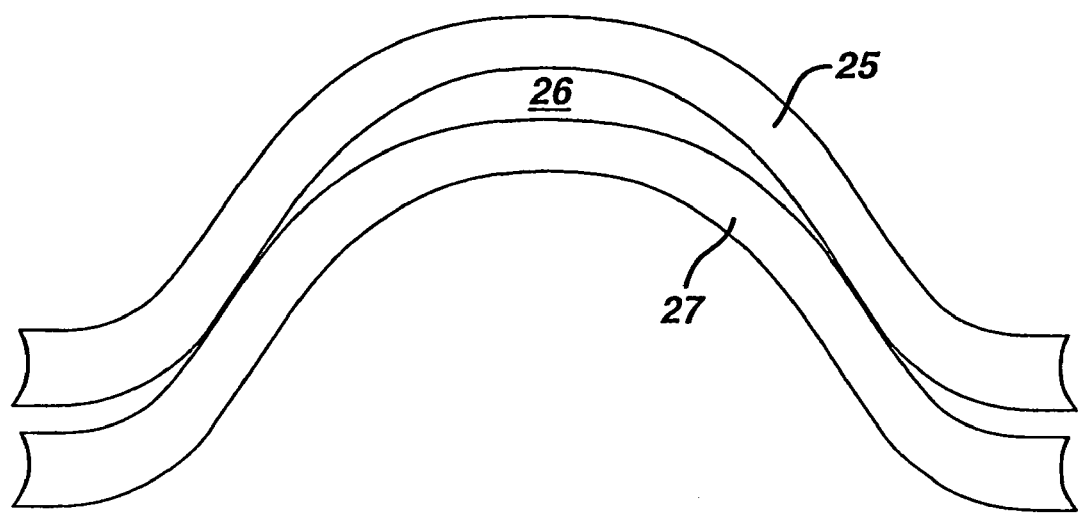
FIGS. 12A and 12B show prior art materials wherein adjacent layers do not fully nest.
Figure 12B:
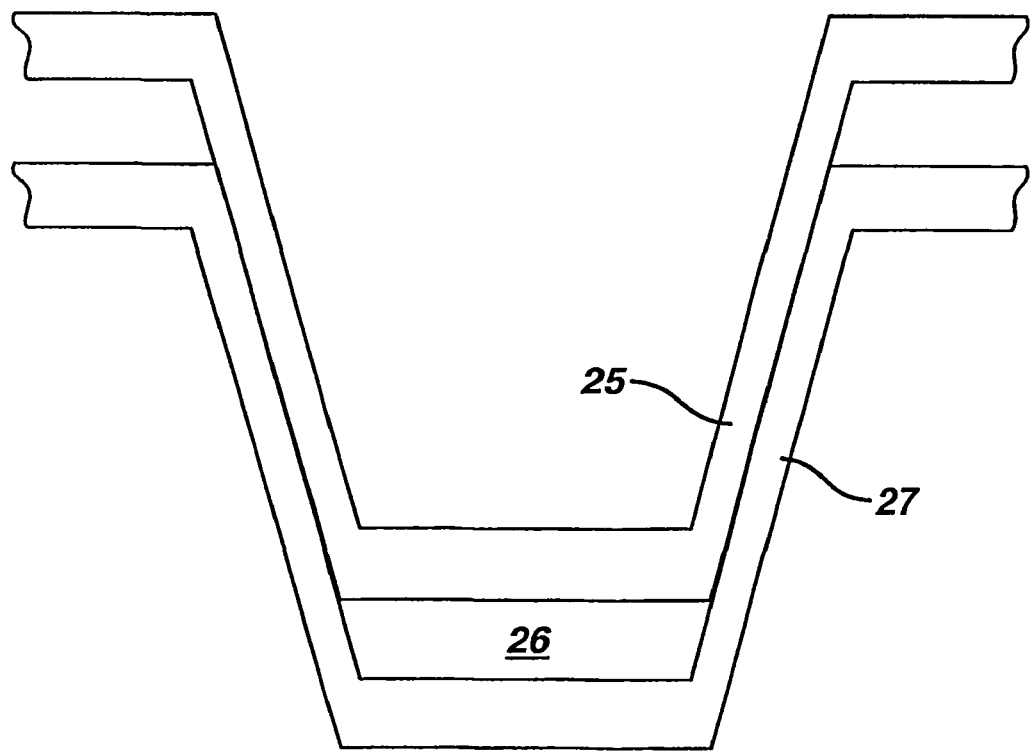

FIGS. 12A and 12B show protuberances formed in substrates according to the prior art. Previously, various substrates are separately manipulated to form identical domes. Such identical domes, cups or other protuberances can never nest completely because the outside diameter of the next dome can only fit to where the inside diameter of the previous one allows it. This results in air spaces, 26, between the tops of the domes and between the substrates. Consequently, the layers and protuberances of the prior art are "loosely stacked." This results in a less compact product that does not have all the benefits of the first series of embodiments of the present invention, e.g. the nesting which permits the domed packaging material to occupy a minimal amount of space prior to use. Also, large sheets cannot be made by folding and forming and then unfolding.

FIG. 13 is a schematic diagram showing a key where O indicates a down dome and an X indicates an up dome. Thereafter, a pattern or algorithm of up and down domes is presented which is believed to provide an asymmetric pattern that, after formed in a plurality of layers of a substrate, when the layers are separated and disoriented, it is believed that this pattern will tend to reduce the re-nesting of the layers. Importantly, any pattern or dome shapes that are non-repetitive would serve to decrease the likelihood of re-nesting. While any pattern of domes is considered to be within the scope of the present invention, the more non-repetitive, the better. As can also be seen with FIG. 13, besides varying domes from up and down, they can also be varied in positioning, i.e. they can be in front or behind, i.e. they can be aligned vertically (square) or diagonally to further decrease repetitiveness, and consequently, decrease the likelihood that separated layers will re-nest.

Figure 14:
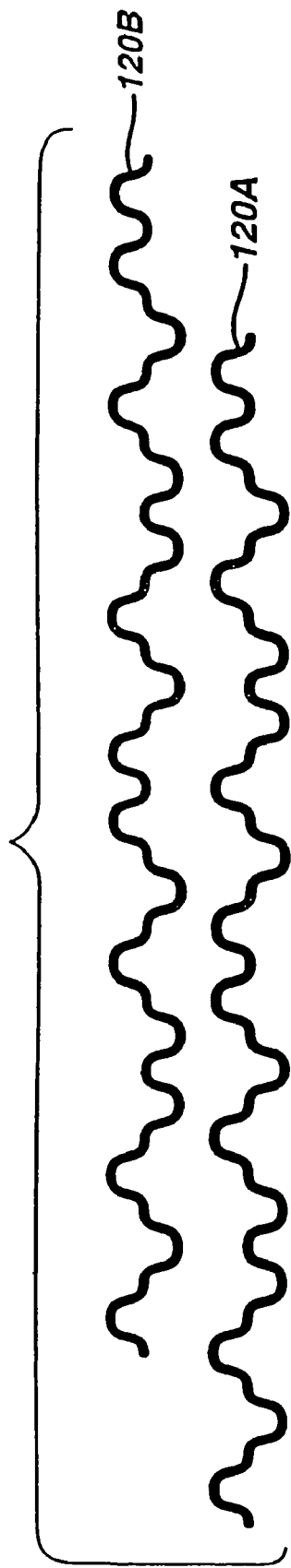
FIGS. 14 and 15 are side views of a dome scheme designed to prevent renesting of adjacent layers after same are disoriented.
Figure 15:
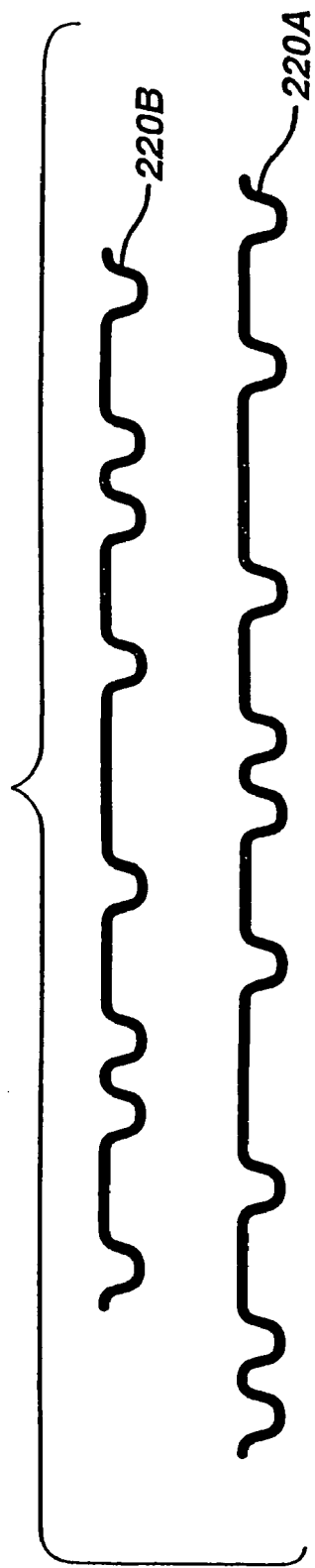

FIGS. 14 and 15 are side views of up and down or down only respectively, dome patterns made in accordance with the present invention wherein the domed patterns can be formed in adjacent layers for example, layer 120A and 120B in FIG. 14 and layers 220A and 220B in FIG. 15. In a formed position, the layers have the same pattern of domes formed therein, but when the layers are separated and disoriented, the dome patterns tend to resist and prevent re-nesting and serve to maintain the packing material in a condition wherein same takes up a relatively large space.

Importantly, the product of the present invention can be made utilizing a thermal forming process or other ways known in the art, or as noted above, a cold forming process (deformations at around room temperature). Also, the present invention is very suitable for use with recycled scrap polymeric materials as long as they are ductile when heated or at room temperatures. One example of an appropriate material is PETE (amorphous polyethylene terephthalate), although other plastics and other materials are contemplated as well. A preferred material plastic material will be cold extendable in excess of 100% before breaking without elastic spring-back Importantly, one can easily dispose packing material after use in any desired manner. While packing material such as bubble wrap continues to occupy space after use, the domes of the present invention can be collapsed by the application of sufficient pressure.

Figure 16:
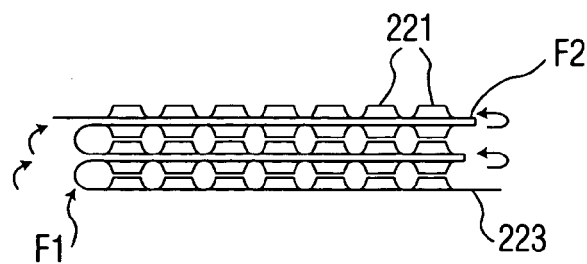
FIG. 16 is in edge view of packing material with domes projecting in the same direction from one side of a web that is folded to show non-nesting of domes.

Referring to FIG. 16, layer 223 has domes 221 projecting from the same side, and the layer is segregated into a number of sections or pleats separated by outside folds F1 and inside folds F2. It will be noted that when folded in this fashion, the stack height increases relatively quickly.

Figure 17:
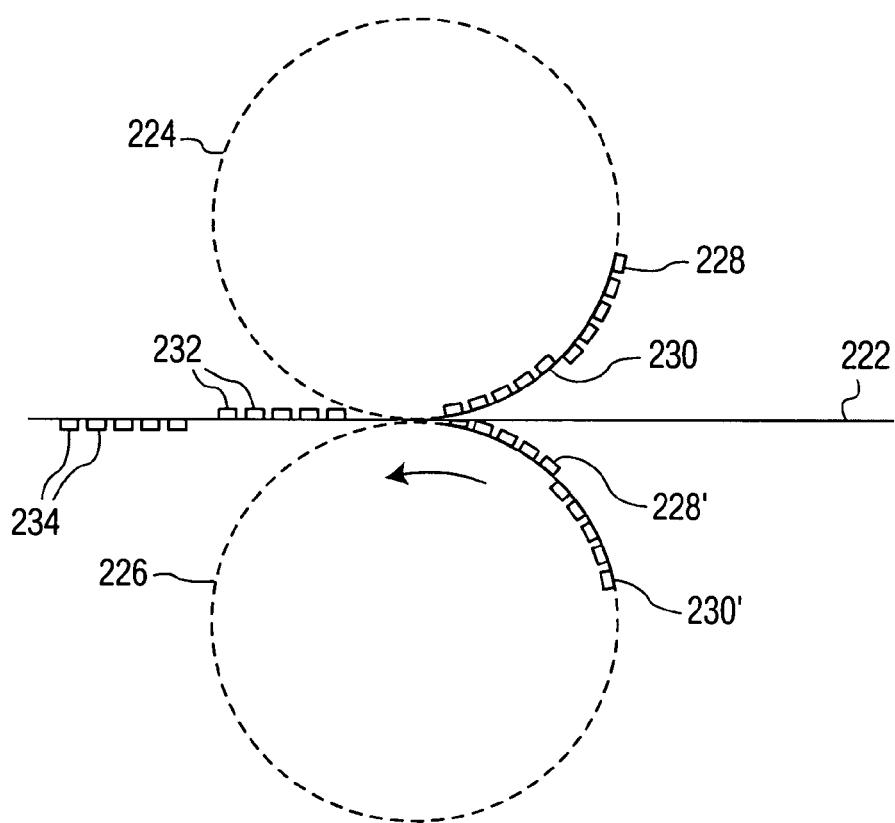
FIG. 17 is a schematic diagram of a pair of opposing rotary dies pressing a web to form successive sections having domes that are inverted relative to successive sections.

Referring to FIG. 17, web 222 is shown as a single layer of pliable material that is being fed into an opposing pair of rotary dies 224 and 226 (although multiple layers can be simultaneously fed through the rotary dies in some embodiments). The dies 224 and 226 have respective convexities 228 and 228' that are complementary to and mesh with concavities 230 and 230'. In this manner, web 222 is pressed to produce sections with a number of positive domes 232 interleaved with sections with negative (inverted in mirror image fashion) domes 234.

Figure 18:
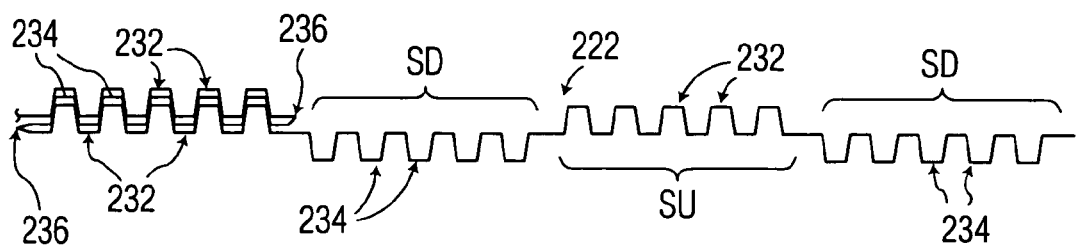
FIG. 18 shows the web of FIG. 17 with successive sections folded together to nest the domes.

As shown in FIG. 18, the successive sections SU and SD of web 222 are shown formed into a number of pleats separated by folds 236. Because the domes 232 of pleat sections SD are inverted in mirror image fashion relative to the domes of pleat sections SU, after folding, domes 232 nest into domes 234, and domes 234 nest into domes 232, as illustrated. This fan-folded stack forms separable layers of pliable material that can act as packing material when unfolded and disoriented.

Preferably, rotary dies 224 and 226 will have on their circumferences an intermeshing groove and ridge to form a fold line between the sections SU and SD. Alternatively, dies 224 and 226 can form a line of perforations that facilitate the folding between the sections SU and SD, and can also be used to tear the sections apart. In still other embodiments, dies 224 and 226 can have a blade that severs the sections SU and SD.

Figure 19:
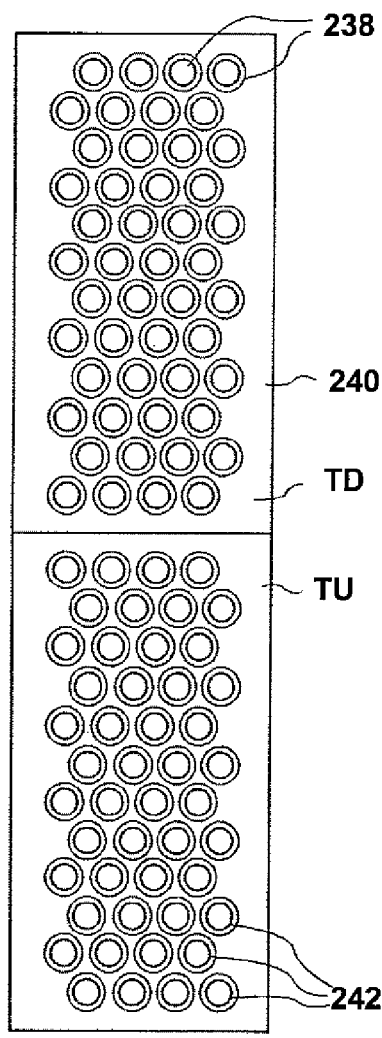
FIG. 19 is a development of the surface of a rotary die that is an alternate to that of FIG. 18.
Figure 20:
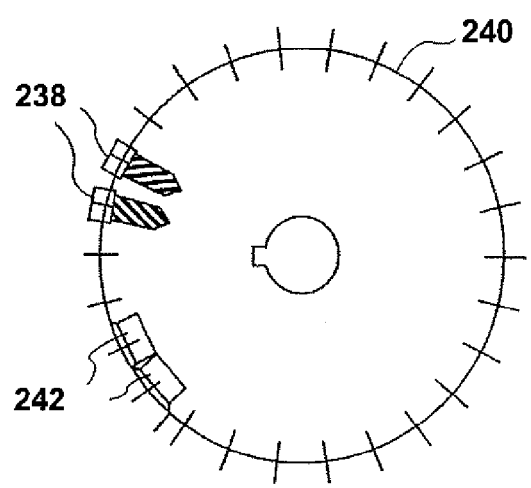
FIG. 20 is a side view of the rotary die of FIG. 19.

Referring to FIGS. 19 and 20, a rotary die 240 is shown fitted with a number of threaded studs 238 having substantially frustroconical heads designed as convexities to form the previously mentioned domes. Die 240 also has a number of frustroconical bores 242 designed as concavities to form the previously mentioned inverted (mirror image) domes.

The development of FIG. 19 shows the surface of the die 240 formed into two complementary sections TD and TU, thereby making die 240 a single cycle die, although other embodiments can have multiple cycles. It will be noted that the regions having convexities or concavities are arranged in a staggered pattern with a repetitive unit being a trio of elements located at the vertices of an equilateral triangle. Specifically, in FIG. 19 these elements are arranged in horizontal rows and two other groups of rows slanted ±60° from horizontal. It will be appreciated that other patterns can be employed, including the patterns previously described or mentioned.

Figure 21:
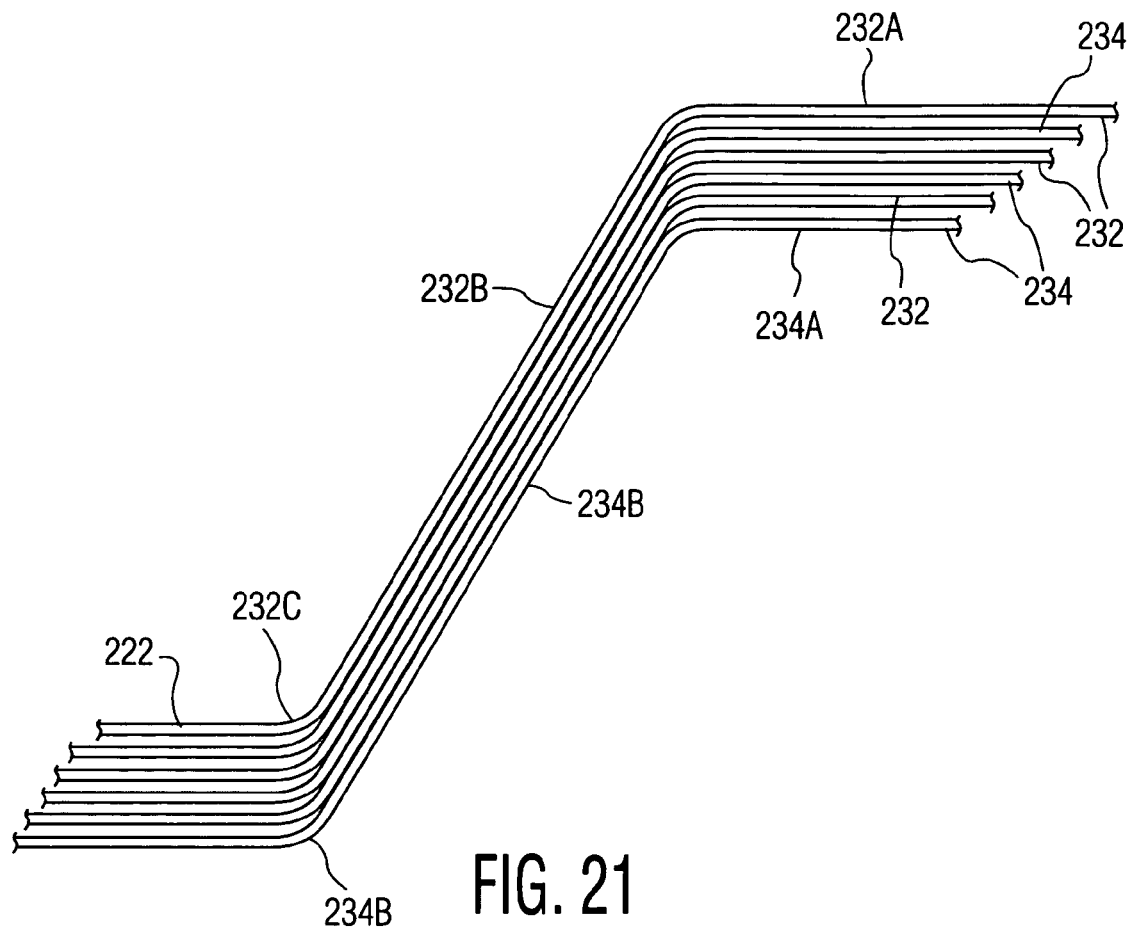
FIG. 21 is a detailed, fragmentary, cross-sectional view of packing material comprising separable layers of pliable material that is formed with the equipment of FIG. 19 (or formed otherwise) and showing a small overhead and base gap between adjacent domes.
Figure 22:
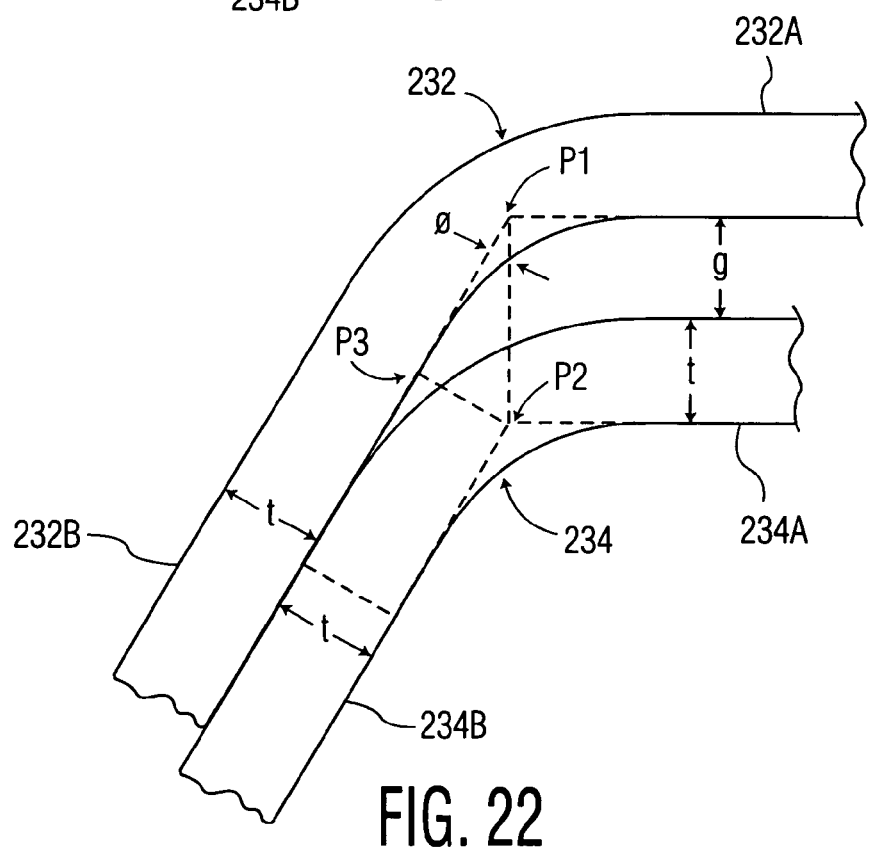
FIG. 22 is a detail from the cross-sectional view of FIG. 21.

Referring to FIGS. 21 and 22 the nested domes 232 (and 234) previously illustrated in FIG. 18 each have a relatively flat circular top 232A (234A) with a rounded edge, and a frustroconical side 232B (234B) leading to a rounded corner forming a base 232C (234C). In this embodiment the domes 232 and 234 are identical and therefore will nest in such a way as to create an overhead gap g (in general the overhead gap will be the maximum space between fully nested domes). Also in this embodiment the overhead gap g is the same as the base gap (gap between layers 222 existing outside of the domes). As shown in FIG. 22, the insides of domes 232 and 234 are analyzed as simple frustroconical surfaces. Although their borders are actually rounded, these surfaces can be analyzed by considering them as having sharp virtual corners P1 and P2, respectively. When fully nested, corners P1 and P2 will be vertically aligned and separated by a distance equal to the overhead gap g plus the wall thickness t of dome 234.

Viewed in FIG. 22 as points, corners P1 and P2 form the hypotenuse of a right triangle with point P3, which is at the perpendicular intersection of a line through point P2 and the line running along the interface of sides 232B and 234B. The conical angle ø (the ordinary angle (not the solid angle) between the conical axis and a conical ray on the conical surface) gives an overhead gap g=t (cscø−1). The foregoing assumed that the wall thickness t at the tops 232A and 234A is the same as at the sides 232B and 234B. If this is not the case, appropriate corrections can be made. In fact, a certain amount of thinning can be expected when the material is stretched. In one embodiment, a web material starting with a nominal thickness of 0.004 inch will be stretched to produce at its thinness point a wall thickness of 0.003 inch.

In this specification the angle of divergence will be defined at a given point on the inside of a dome relative to a normal axis, which is an axis perpendicular to a flat surface on which the layer may be resting and supported evenly. In the embodiment of FIGS. 21 and 22 the normal axis is any line perpendicular to the main layer 222, or perpendicular to the tops 232A and 234A (e.g., line P1-P2 of FIG. 22). The angle of divergence will be defined as the angle between the normal axis and a tangent plane tangent to the dome surface at the given point (the angle between a line and plane being defined as the ordinary angle of elevation from the plane).

Referring to FIGS. 21 and 22 and taking as an example an angle of divergence ø=30°, the overhead gap g will equal the wall thickness t. At an angle of divergence ø=19.5°, the overhead gap g will be about twice the wall thickness t. Thus, the greater the angle of divergence, the smaller the overhead gap g. Also, the smaller the wall thickness t, the smaller the overhead gap g.

It has been discovered that if the wall thickness t is sufficiently small and if the angle of divergence ø is sufficiently large, the domes 232 and 234 will nest with a relatively small overhead gap g and many layers 222 can be stored compactly. For example, with a wall thickness of 0.008 inch and an angle of divergence of 30°, each additional layer increases the stack height by 2t, that is, only by 0.016 inch. Thus a stack of 500 layers will only be 8 inches thicker than a single layer. Thus, with a single sheet having an overall height of ¼ inch, 500 layers will only be 8.25 inches thick. If the layers are disoriented, the stack thickness becomes 125 inches, an increase by a factor of more than 15.

On the other hand, if the angle of divergence ø is too small the advantage is lost. For this reason, it is important to keep the angle of divergence ø>10°, in which case the increment for each additional layer is less than 5.76 t. In preferred embodiments, the angle of divergence ø≧25°, while for highly compact preferred embodiments the angle of divergence ø≧45°.

In order to maintain the advantage of compact stacking and nesting, the wall thickness is preferably kept between 0.003 and 0.012 inch, and in highly preferred embodiments kept between 0.004 and 0.007 inch. To maintain the advantage of creating a large volume increase by disorienting the layers, preferred layers will have an overall thickness of at least ⅛ inch.

Figure 23:
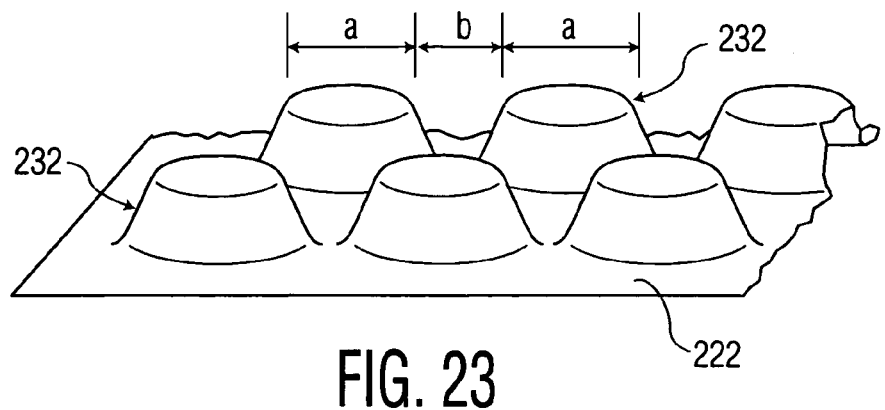
FIG. 23 is a fragmentary, perspective view of one of the separable layers of FIG. 21.
Figure 24A:
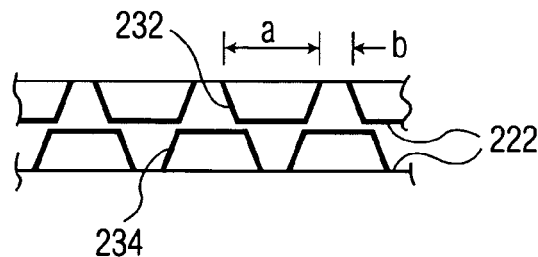
FIG. 24A is a cross-sectional view of an opposing pair of layers each in accordance with that shown in FIG. 21 and showing the inability of domes of one layer to intervene between domes of the other layer.
Figure 25:
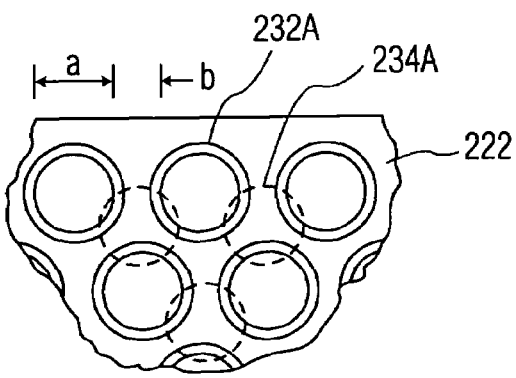
FIG. 25 is a plan view of the layers of FIG. 24A, one of the layers being illustrated in phantom.

Referring to FIGS. 23, 24A, and 25, previously mentioned domes 232 and 234 are shown separated and in FIG. 24A they are shown facing each other top to top. In this embodiment the effective diameter a of the tops of the domes is chosen so that with the tops of the domes separated by the gap b, the domes cannot interdigitate.

In the worse case, shown in FIG. 25, the tops 234A of domes 234 are placed at the center of the equilateral triangle defined by the repetitive trios of domes 232. From the geometry of the dome spacing of FIG. 25, the center to center distance between dome tops 232A is a+b=√3d, where d is the distance from the center of dome top 234A to the center of dome top 232A. The radius r of the largest circle that will fit inside the trio of circular dome tops 232A of diameter a will be r=d−a/2. The dome tops cannot interdigitate if a>2r, i.e., the ratio a/2r>1. Since the ratio a/2r=(1−b/r)/(2−√3) interdigitation is avoided when b<r/2(√3−1)<0.366a.

In a preferred embodiment the diameter a of the top of the domes is about ½ inch while the space b between the tops of the domes is ⅛ inch. It will be appreciated however, that the dome diameter can be larger or smaller in other embodiments.

Figure 24B:
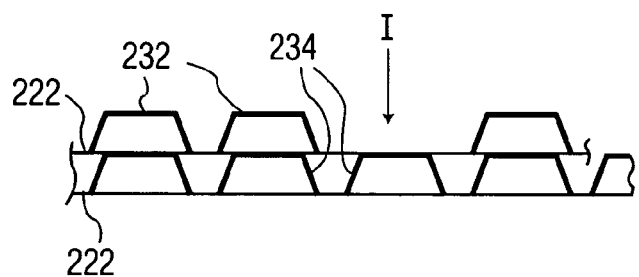
FIG. 24B is a cross-sectional view of an opposing pair of layers each in accordance with that shown in FIG. 21 but modified to show an interval without domes that prevents the layers from nesting together.

In instances where the dome pattern does not satisfy the above relationship, nesting of domes can still be avoided with a dome pattern having an interval where no dome exists. For example, in FIG. 24B the illustrated upper layer has an interval I with no dome. Accordingly, the underlying dome 234 engages the flat, domeless interval I and cannot nest.

Figure 24C:
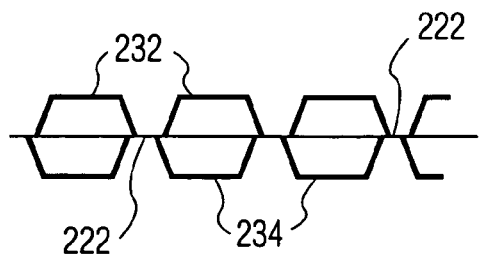
FIG. 24C is a cross-sectional view of an opposing pair of layers each in accordance with that shown in FIG. 21 and showing the layers overlaid base to base.

For completeness, FIG. 24C shows two layers overlaid base to base. Clearly, nesting is impossible in this configuration.

Figure 26:
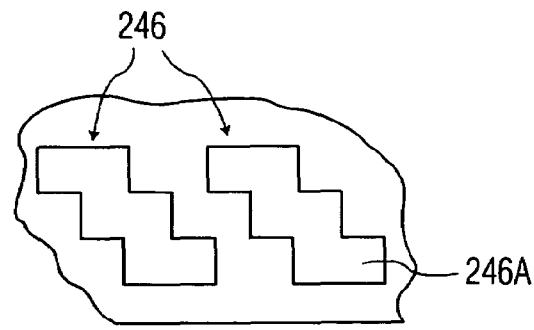
FIG. 26 is a plan view of elongated domes that are an alternate to the domes shown in FIG. 23.
Figure 27:
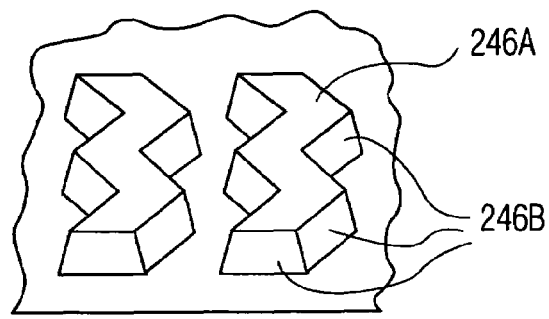
FIG. 27 is a perspective view of the elongated domes of FIG. 26.

It will be appreciated that domes need not be axially symmetric as shown in the prior illustrations. In FIGS. 26 and 27, the tops 246A of elongated domes 246 have a staircase-like pattern and angularly diverging sides 246B. The sides 246B have a number of inside and outside corners tending to strengthen the elongated domes 246.

Figure 28:
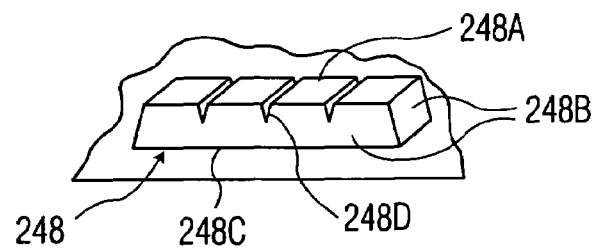
FIG. 28 is a perspective view of an elongated dome that is an alternate to that of FIG. 27.

In FIG. 28 alternate dome 248 has a rectangular base 248C rising at a converging angle to a top 248A. The four corners formed in the sides 248B strengthen the dome 248. Top 248A has a number of V-shaped grooves 248D, which also strengthen the dome 248.

To facilitate an understanding of the principles associated with the foregoing apparatus, its operation will be briefly described in connection with the layer 222 illustrated in FIG. 23. It will be appreciated that the layer 222 can be folded and nested as shown in FIG. 18 (or can be manufactured as separate identical sheets that are stacked together). The layer 222 has a dome pattern that makes renesting difficult. Specifically, the domes 232 and 234 are oriented up and down, which makes the chance of renesting small. As mentioned previously, some dome patterns may employ differently sized domes or domes arranged in an irregular pattern, which makes renesting unlikely. Accordingly, once the layer 222 is unfolded and the individual sections separated, the material can be handled without being concerned about inadvertent renesting.

Once unfolded, the layer 222 can be placed about an object in various ways. In some cases the user will wrap or wind layer 222 around an object to cushion and protect it, without regard to any container where the object may eventually be placed. In fact, this method may be useful to protect the object in cases where the object will not be immediately placed in a container. For large objects, separate layer sections can be secured to the outside of the object as a single layer or as a disoriented stack of layers, depending on the desired degree of protection. In some embodiments, the object may be placed on a bed of layers 222 in a container. Thereafter, additional layers 222 can be placed on all sides of the object and on top of the object. The layers 222 can be folded or crumpled and placed in voids between the object and the container. Alternatively, the layers can fill such a void by being spiraled or wrapped around the object.

Obviously, many modifications and variations of the present invention are possible in light of the above teachings. It is therefore to be understood that within the scope of the appended claims, the invention may be practiced otherwise than as specifically described.

The invention claimed is:

1. A packing material comprising:
a plurality of separable layers of pliable material each having a region containing a plurality of domes in a pattern extending in two directions, said plurality of domes being nested together in said region, said plurality of domes each having a top, a base and a side extending from the top to the base at an angle of divergence exceeding 10°, said plurality of domes having a dome height of at least ⅛ inch, wherein first and second domes of adjacently nested pairs of the domes are differently sized and have between them an overhead gap no greater than 10% of the dome height, wherein said plurality of separable layers with the plurality of domes can be separated and disoriented to occupy a larger volume.

2. A packing material according to claim 1 wherein corresponding ones of the domes from the plurality of layers that nest together have substantially equal height.

3. A packing material according to claim 1 wherein the sides of the domes have a predetermined wall thickness, adjacently nested ones of the domes from adjacent ones of the separable layers having an overhead gap no greater than twice the wall thickness of the sides of the domes.

4. A packing material according to claim 1 wherein the sides of the domes have a predetermined wall thickness, adjacently nested ones of the domes from adjacent ones of the separable layers having an overhead gap no greater than the wall thickness of the sides of the domes.

5. A packing material according to claim 1 wherein in each of the separable layers at least some of the domes are sized and spaced to prevent insertion between the domes of another one of the layers.

6. A packing material according to claim 1 wherein said angle of divergence is kept at 25° or more.

7. A packing material according to claim 1 wherein said angle of divergence is kept at 45° or less.

8. A packing material according to claim 1 wherein each of said plurality of separable layers has an approximate thickness of at most 0.012 inch.

9. A packing material according to claim 1 wherein each of said plurality of separable layers has an approximate thickness of between 0.003 to 0.012 inch.

10. A packing material according to claim 1 wherein said pattern has some laterally adjacent ones of said plurality of domes on a common one of said plurality of separable layers sized differently.

11. A packing material according to claim 1 wherein said pattern has some laterally adjacent ones of said plurality of domes shaped differently.

12. A packing material according to claim 1 wherein said pattern is asymmetrical.

13. A packing material according to claim 1 wherein said pattern has some laterally adjacent ones of said plurality of domes oriented to protrude in opposite directions.

14. A packing material according to claim 1 wherein at least some of the domes in each of the layers are axially asymmetric.

15. A packing material according to claim 1 wherein at least some of the domes in each of the layers are elongated.

16. A packing material according to claim 15 wherein at least some of the domes in each of the layers have an undulating surface.

17. A packing material assembly comprising:
a plurality of film layers disposed one on top of another as a stack and being individually separable, each of the layers including a plurality of domes in a pattern extending in two directions, each of the domes having a top, a base and a side extending from the top to the base at an angle of divergence, wherein each of the film layers has a thickness T at the base, a thickness t at the tops of each of the domes and a height H between a top surface of the top of each of the domes and a top surface of the base of each of the domes, wherein the domes of a first of the film layers are nested within or over the domes of a second of the layers, wherein the second layer overlies or underlies the first layer, wherein first and second domes of a pair of the adjacently nested domes are differently sized and have between them an overhead gap no greater than 10% of H, such that the height of the stack does not exceed:

$$T+H+(L-1)*(t+10\% \text{ H})$$

where L is the number of film layers in the stack.

18. The packing material assembly of claim 17, wherein the successive film layers form a continuous sheet having a fan-folded stack configuration and the domes in each successive pair of the film layers are inverted in mirror image fashion.

19. The packing material assembly of claim 17, wherein, when a plurality of successive layers of the film layers are removed from the stack and individually separated, the successive layers can be disoriented to occupy a volume larger than a volume occupied by the successive layers when disposed over one another with the domes of the adjacent layers nested together.

* * * * *